(12) United States Patent
Li et al.

(10) Patent No.: US 8,064,867 B2
(45) Date of Patent: *Nov. 22, 2011

(54) RX DUAL-BAND MIXER

(75) Inventors: Qiang (Tom) Li, Irvine, CA (US);
Hooman Darabi, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 701 days.

This patent is subject to a terminal disclaimer.

(21) Appl. No.: 12/136,706

(22) Filed: Jun. 10, 2008

(65) Prior Publication Data

US 2008/0242254 A1     Oct. 2, 2008

Related U.S. Application Data

(63) Continuation of application No. 10/922,531, filed on Aug. 20, 2004, now Pat. No. 7,386,290.

(60) Provisional application No. 60/592,742, filed on Jul. 30, 2004.

(51) Int. Cl.
H04B 15/00 (2006.01)
H04B 1/26 (2006.01)
H04B 1/28 (2006.01)

(52) U.S. Cl. ......... 455/313; 455/318; 455/323; 455/333
(58) Field of Classification Search .......... 455/323–326, 455/257–260, 313, 318–319, 333
See application file for complete search history.

(56) References Cited

U.S. PATENT DOCUMENTS

| | | | | |
|---|---|---|---|---|
| 6,125,268 A * | 9/2000 | Boesch et al. | ............. | 455/168.1 |
| 6,819,914 B2 * | 11/2004 | Yan et al. | ............. | 455/318 |
| 6,917,815 B2 * | 7/2005 | Hajimiri et al. | ............. | 455/552.1 |
| 7,155,184 B2 * | 12/2006 | Kim | ............. | 455/205 |
| 7,263,344 B2 * | 8/2007 | Manku | ............. | 455/323 |
| 7,333,565 B2 * | 2/2008 | Oono et al. | ............. | 375/307 |
| 2002/0147014 A1 * | 10/2002 | Atarius et al. | ............. | 455/436 |
| 2004/0259518 A1 * | 12/2004 | Aktas et al. | ............. | 455/323 |
| 2007/0111661 A1 * | 5/2007 | Bargroff et al. | ............. | 455/13.3 |

* cited by examiner

*Primary Examiner* — Simon Nguyen

(74) *Attorney, Agent, or Firm* — Garlick Harrison & Markison; Bruce E. Garlick

(57) ABSTRACT

A dual-band input transceiver block is formed to operably receive one of a 2.4 GHz radio frequency signal or a 5.0 GHz radio frequency transceiver signal in a manner that minimizes duplication of circuitry and creates a combined circuit path for RF front end input stages for much of the input stage. More specifically, the embodiments of the present invention include separate amplification and mixing stages whose outputs are combined by a stabilized load with circuitry for removing a common mode feedback signal. As such, downstream components, such as amplifiers, filters, analog-to-digital converters, and other input path circuit elements, are not duplicated and may be used regardless of whether the dual-band transceiver is operating in a first or second frequency band. Operation is, in the described embodiment, only one frequency input at a time though the invention is not limited to such operation. More specifically, a first input section is operably coupled to receive a first local oscillation input and a first frequency band signal input. A second input section is coupled to receive a second local oscillation input and a second frequency band signal input. Outputs of the first and second input sections are produced to a stabilized load with a common mode feedback block for removing a common mode feedback signal. As such, an output signal is produced having a regulated DC level and having any common mode feedback signal eliminated there from.

22 Claims, 8 Drawing Sheets dual-band input transceiver block 150

Dual-band input transceiver block dual LO output PLL

RX DUAL-BAND MIXER

CROSS-REFERENCE TO RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 10/922,531, entitled "RX Dual-Band Mixer,", filed Aug. 20, 2004, pending, which claims priority pursuant to 35 U.S.C. §119(e) to the following U.S. Provisional Patent Application which is hereby incorporated herein by reference in its entirety and made part of the present U.S. Utility patent application for all purposes:
    a. U.S. Provisional Application Ser. No. 60/592,742, entitled "RX Dual-Band Mixer,", filed Jul. 30, 2004, expired.

BACKGROUND

1. Technical Field

The present invention is directed in general to wireless communication systems. In one aspect, the present invention relates to a method and system for controlling the bandwidth properties of an adaptive mixer in a wireless communication device.

2. Related Art

Communication systems are known to support wireless and wire-lined communications between wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution service (MMDS)

Depending on the type of wireless communication system, a wireless communication device (such as a cellular telephone, two-way radio, personal digital assistant (PDA), personal computer (PC), laptop computer, home entertainment equipment, etc.) communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over the tuned channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switched telephone network (PSTN), via the Internet, and/or via some other wide area network.

Wireless communication devices typically communicate with one another using a radio transceiver (i.e., receiver and transmitter) that may be incorporated in, or coupled to, the wireless communication device. The transmitter typically includes a data modulation stage, one or more intermediate frequency stages and a power amplifier. The data modulation stage converts raw data into baseband signals in accordance with a particular wireless communication standard. The intermediate frequency stages mix the baseband signals with one or more local oscillations to produce RF signals. The power amplifier amplifies the RF signals prior to transmission via an antenna.

In direct conversion transmitters/receivers, conversion directly between baseband signals and RF signals is performed. The receiver is typically coupled to an antenna and includes a low noise amplifier, one or more intermediate frequency stages, a filtering stage and a data recovery stage. The low noise amplifier receives inbound RF signals via the antenna and amplifies them. The intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Wireless communication devices for multimedia audio and video applications generally require a higher data rate than is currently available with devices operating under the 802.11a, 802.11b, and 802.11g standards. Several draft standards (such as the 802.11n draft standard) have been proposed to implement faster data rates for wireless devices. Wireless devices operating under these standards will be capable of providing data rates of up to 200 Mbps. Since these standards have not been finalized, they will be referred to generically as 802.11x herein.

As new designs are developed to achieve these higher data rates, there also exists a desire to maintain backwards compatibility for a plurality of beneficial reasons, including enabling new generation host devices to communicate with older generation access points. Moreover, there is a continuing trend and desire to reduce the footprint size of the dye, notwithstanding ever-increasing levels of circuit complexity. Thus, it is possible to design a single integrated circuit radio transceiver that includes two complete radio circuits to maintain backwards compatibility with older systems while providing the benefits of the newer systems. Such an approach goes against the desire for decreasing the size of the dye, as well as the power consumption of the dye. Accordingly, what is needed is a new generation integrated circuit radio transceiver that provides the high data rates of the newer systems, provides backwards compatibility, and minimizes any increases in the size of the dye to accommodate said functionality.

SUMMARY OF THE INVENTION

A dual-band input transceiver block is formed to operably receive one of a 2.4 GHz radio frequency signal or a 5.0 GHz radio frequency transceiver signal in a manner that minimizes duplication of circuitry and creates a combined circuit path for RF front end input stages for much of the input stage. More specifically, the embodiments of the present invention include separate amplification and mixing stages whose outputs are combined by circuitry for stabilizing a common mode output level. As such, downstream components, such as amplifiers, filters, analog-to-digital converters, and other input path circuit elements, are not duplicated and may be used regardless of whether the dual-band transceiver is operating in a first or second frequency band.

More specifically, a first input section is operably coupled to receive a first local oscillation input and a first frequency band signal input. A second input section is coupled to receive a second local oscillation input and a second frequency band signal input. Outputs of the first and second input sections are produced to a load with a common mode feedback block for stabilizing a common mode output level. As such, an output signal is produced having a regulated DC level and having any common mode feedback signal eliminated there from.

In operation, the embodiment of the present invention includes receiving a first input signal in a first frequency band at a first input transistor pair and receiving a first local oscillation signal having a first local oscillation frequency at a first switching pair. Additionally, the invention includes receiving a second input signal in a second frequency band at a second input transistor pair and receiving a second local oscillation signal having a second local oscillation frequency at a second switching pair. In one embodiment of the invention, the first local oscillation signal is divided by a factor of N to produce the second local oscillation signal. The invention comprises at least one of mixing the first input signal with the first local oscillation signal to produce a first down-converted signal and mixing the second input signal with a second local oscillation signal to produce a second down-converted signal. In the embodiments of the invention, the first and second down-converted signals are produced to a front end combined input path where they are filtered, amplified, and produced to a baseband block.

The objects, advantages and other novel features of the present invention will be apparent from the following detailed description when read in conjunction with the appended claims and attached drawings.

DETAILED DESCRIPTION

A method and apparatus for an improved wireless communication system is described. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of communication systems to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
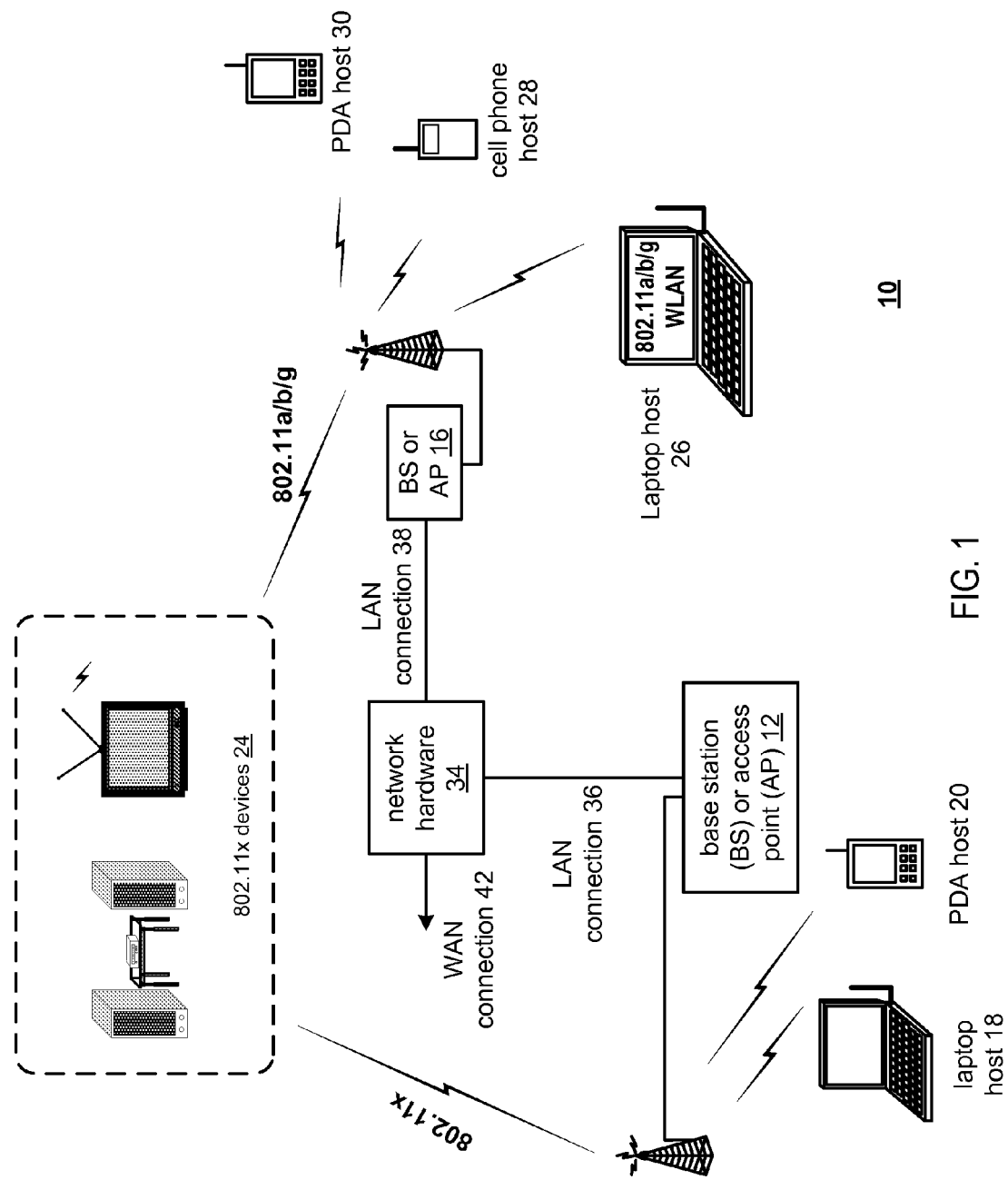
FIG. 1 is a schematic block diagram of a wireless communication system in accordance with the present invention.

FIG. 1 illustrates a wireless communication system 10 in which embodiments of the present invention may operate. As illustrated, the wireless communication system 10 includes a plurality of base stations or access points 12 and 16, a plurality of wireless communication devices 18-30 and a network hardware component 34. The wireless communication devices 18-30 may be laptop host computers 18 and 26, personal digital assistant hosts 20 and 30, cellular telephone host 28, an 802.11a WLAN device, an 802.11g WLAN device and/or an 802.11x device 24. The details of the wireless communication devices will be described in greater detail with reference to FIGS. 2-7.

As illustrated, the base stations or access points 12 and 16 are operably coupled to the network hardware 34 via local area network connections 36 and 38. The network hardware 34 (which may be a router, switch, bridge, modem, system controller, etc.) provides a wide area network connection 42 for the communication system 10. Each of the base stations or access points 12 and 16 has an associated antenna or antenna array to communicate with the wireless communication devices in its area. Typically, the wireless communication devices register with a particular base station or access point 12 and 16 to receive services from the communication system 10. For direct connections (i.e., point-to-point communications), wireless communication devices communicate directly via an allocated channel. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

As may be seen, referring specifically to the network of FIG. 1, an 802.11x device 24 is operably coupled to communicate with base stations or access points 12 and 16 by one of 802.11a, 802.11b, 802.11g and 802.11x protocols. As the demand for data throughput increases, there is a continuing design goal to provide new capabilities for host devices. One particular goal of newer generation systems, such as 802.11x systems, is to provide real-time, over-the-air, video between an access point and a host device. Thus, the embodiment of the present invention described herein is operable to communicate over 802.11x to provide the required high data rates for video. Further, however, to maintain backwards compatibility with older access points, 802.11x device 24 further includes radio circuitry to communicate over 802.11a, 802.11b, or 802.11g protocols.

Figure 2:
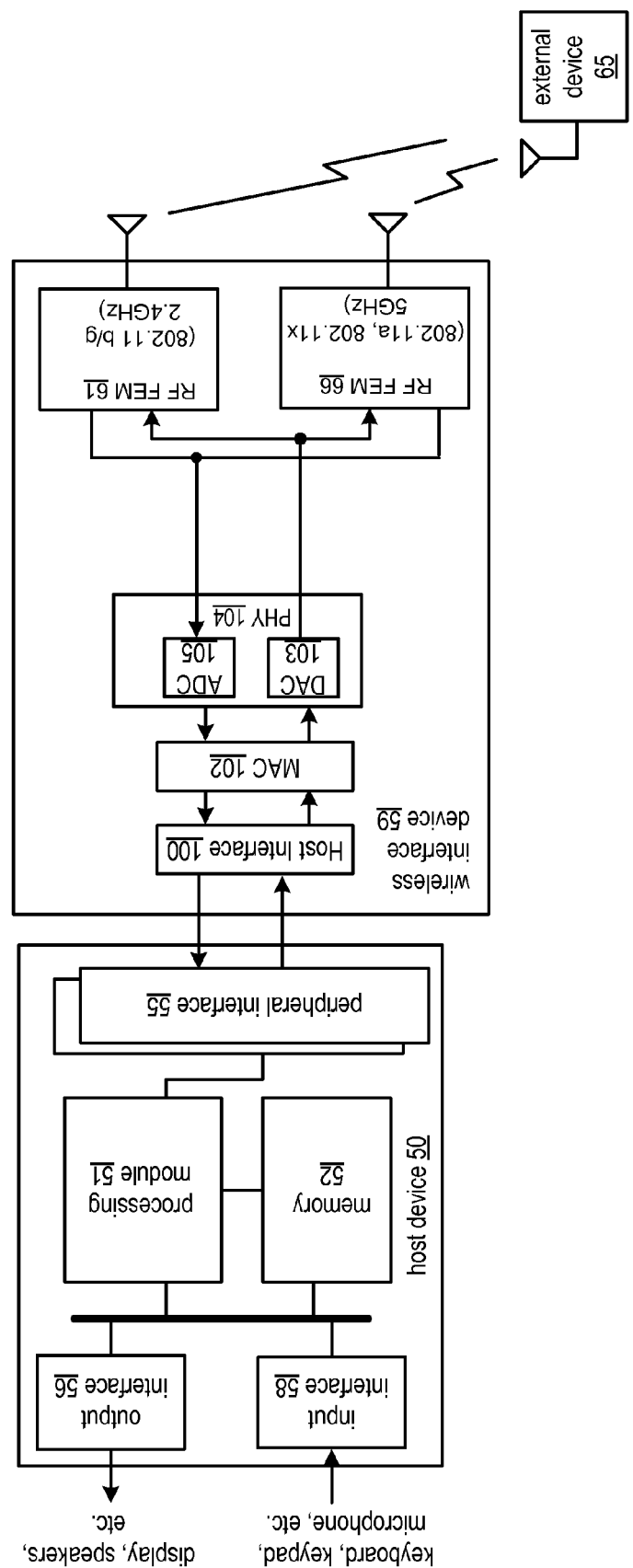
FIG. 2 is a schematic block diagram illustrating a radio implemented in a wireless communication device that includes a host device or module and at least one wireless interface device, or radio transceiver.

FIG. 2 is a schematic block diagram illustrating a radio implemented in a wireless communication device that includes a host device or module 50 and at least one wireless interface device or radio transceiver 59. The wireless interface device may be built-in components of the host device 50 or externally coupled components. As illustrated, the host device 50 includes a processing module 51, memory 52, a peripheral interface 55, an input interface 58 and an output interface 56. The processing module 51 and memory 52 execute the corresponding instructions that are typically done by the host device. For example, in a cellular telephone device, the processing module 51 performs the corresponding communication functions in accordance with a particular cellular telephone standard. For data received from the wireless interface device 59 (e.g., inbound data), the peripheral interface 55 provides the data to the processing module 51 for further processing and/or routing to the output interface 56. The output interface 56 provides connectivity to an output display device, such as a display, monitor, speakers, etc., such that the received data may be displayed. The peripheral interface 55 also provides data from the processing module 51 to the wireless interface device 59. The processing module 51 may receive the outbound data from an input device, such as a keyboard, keypad, microphone, etc., via the input interface 58 or generate the data itself. For data received via the input interface 58, the processing module 51 may perform a corresponding host function on the data, and/or route it to the wireless interface device 59 via the peripheral interface 55.

The wireless interface device 59 includes a host interface 100, a media-specific access control protocol (MAC) layer module 102, a physical (PHY) layer module 104, a digital-to-analog converter (DAC) 103, and an analog-to-digital converter (ADC) 105. Typically, transmit data coming from the host device 50 is presented to the MAC 102, which in turn presents it to the PHY 104. The PHY 104 processes the transmit data (scrambling, encoding, modulation, etc.) and then transmits its output to the DAC 103 for conversion to an analog signal. The DAC output is then gained and filtered and passed to a front end module 61 or 66.

On the receive side, the front end module (61 or 66) output is gained and filtered, then passed to the ADC 105 for conversion to a digital signal. This digital signal is processed (demapped, decoded, descrambled, etc.) by the PHY 104 and the bits are passed through the MAC 102 to the host device 50 for delivery to the output interface 56. As will be appreciated, the modules in the wireless interface device are implemented with a communications processor and an associated memory for storing and executing instructions that control the access to the physical transmission medium in the wireless network.

In addition to a first radio transceiver circuit and RF front end module 61 (that may or may not be integrated on a common substrate with the wireless interface device 59), a second radio transceiver circuit and RF front end module 66 is provided and coupled to the wireless interface device 59. For example, the first radio transceiver circuit and RF front end module 61 transforms baseband data into a 2.4 GHz signal in accordance with the 802.11g standard, while the second radio transceiver circuit and RF front end module 66 transforms baseband data into a 5 GHz signal in accordance with the 802.11a or 802.11x standard.

An external device 65 includes its own wireless interface device for communicating with the wireless interface device of the host device. For example, the host device may be a personal or laptop computer, and the external device 65 may be a headset, personal digital assistant, cellular telephone, printer, fax machine, joystick, keyboard, desktop telephone, or access point of a wireless local area network.

Figure 3:
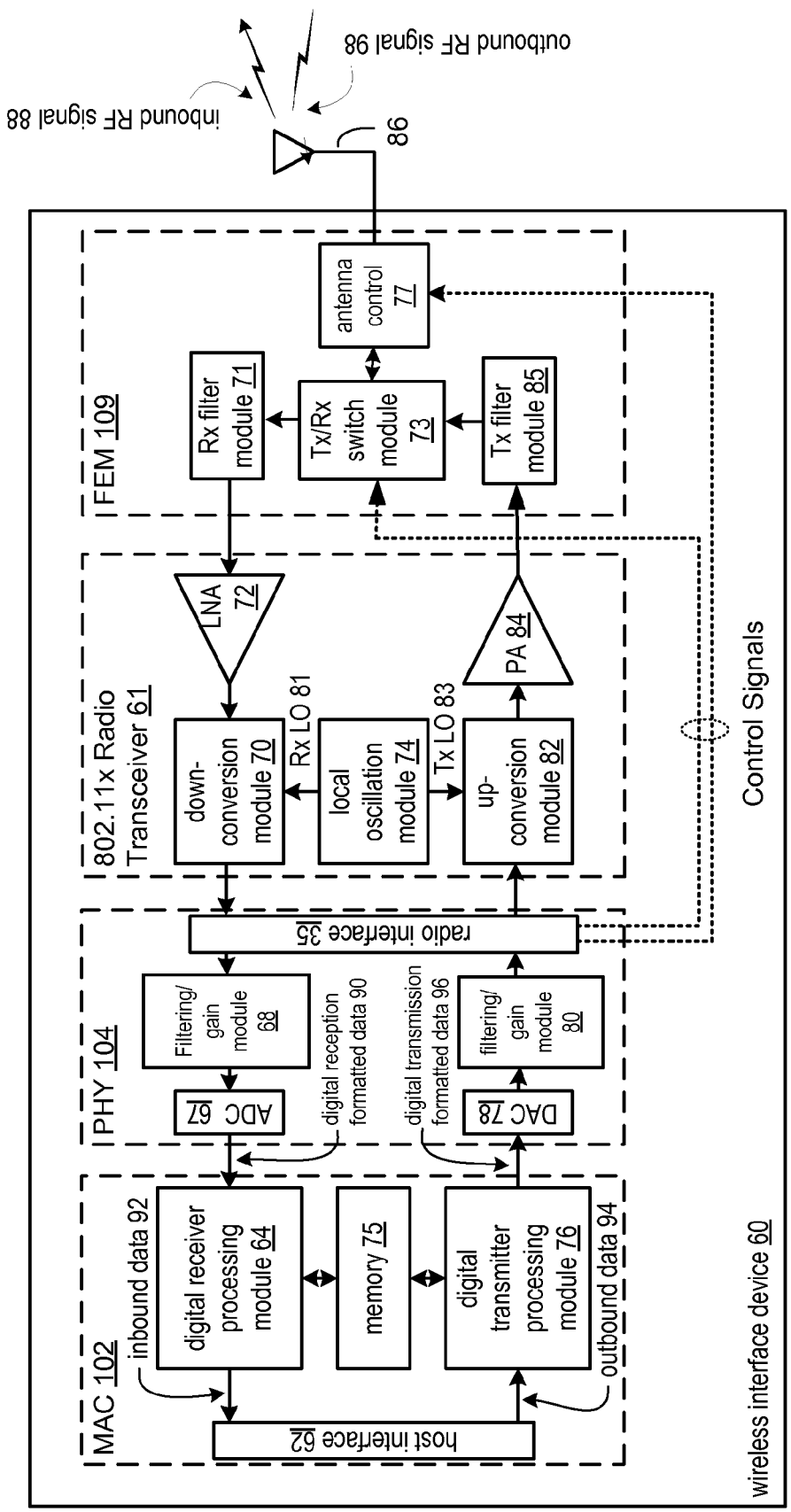
FIG. 3 is a schematic block diagram of a wireless interface device in accordance with the present invention.

FIG. 3 is a schematic block diagram of a wireless interface device (i.e., a radio) 60 which includes a host interface 62, a digital receiver processing module 64, an analog-to-digital converter (ADC) 67, a filtering/gain module 68, a down-conversion module 70, a receiver filter module 71, a low noise amplifier 72, a transmitter/receiver switch module 73, a local oscillation module 74, memory 75, a digital transmitter processing module 76, a digital-to-analog converter (DAC) 78, a filtering/gain module 80, a mixing up-conversion module 82, a power amplifier 84, a transmitter filter module 85 and an antenna control module 77. The transmitter/receiver switch 73 is coupled to the antenna control 77 through which an antenna 86 is coupled to the wireless interface device 60. As will be appreciated, the antenna 86 may be a polarized antenna, dual-band antenna with a diplexor, directional antenna and/or may be physically separated to provide a minimal amount of interference. In addition, the antenna 86 may be used for either transmitting or receiving signals, depending on the switching specified by the transmitter/receiver switch module 73.

The digital receiver processing module 64, the digital transmitter processing module 76 and the memory 75 execute digital receiver functions and digital transmitter functions in accordance with a particular wireless communication standard. The digital receiver functions include, but are not limited to, digital baseband frequency conversion, demodulation, constellation demapping, decoding and/or descrambling. The digital transmitter functions include, but are not limited to, scrambling, encoding, constellation mapping, modulation and/or digital baseband frequency conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing modules 64 and 76 implement one or more of its functions via a state machine, analog circuitry, digital circuitry and/or logic circuitry, the memory storing the corresponding operational instructions may be embedded with the circuitry comprising the state machine, analog circuitry, digital circuitry and/or logic circuitry.

In operation, the wireless interface device 60 receives outbound data 94 from the host device via the host interface 62. The host interface 62 routes the outbound data 94 to the digital transmitter processing module 76, which processes the outbound data 94 to produce digital transmission formatted data 96 in accordance with a particular wireless communication standard, such as IEEE 802.11 (including all current and future subsections), Bluetooth, etc. The digital transmission formatted data 96 will be a digital baseband signal or a digital low IF signal, where the low IF typically will be in the frequency range of one hundred kilohertz to a few megahertz. Subsequent stages convert the digital transmission formatted data 96 to an RF signal using the PHY module 104 and radio transmission circuitry, and may be implemented as follows. The digital-to-analog converter 78 converts the digital transmission formatted data 96 from the digital domain to the analog domain. The filtering/gain module 80 filters and/or adjusts the gain of the analog signal prior to providing it to the radio interface module 35. For transmission in accordance with a first signaling protocol (e.g., IEEE 802.11g, or 802.11x), the radio interface module 35 provides the filtered/adjusted analog signal to the up-conversion module 82. The up-conversion module 82 directly converts the analog baseband or low IF signal into an RF signal based on a transmitter local oscillation clock 83 provided by local oscillation module 74. The power amplifier 84 amplifies the RF signal to produce outbound RF signal 98, which is filtered by the transmitter filter module 85. Antenna switching control signals provided to the transmitter/receiver switch module 73 and antenna control module 77 route the outbound RF signal 98 for transmission to a targeted device, such as a base station, an access point and/or another wireless communication device, via antenna 86.

In accordance with a selected embodiment whereby a signal is to be received in accordance with a first signaling protocol (e.g., IEEE 802.11g or 802.11x), the wireless interface device 60 receives an inbound RF signal 88 from antenna 86 via transmitter/receiver switch module 73 which was transmitted by a base station, an access point, or another wireless communication device. The inbound RF signal is converted into digital reception formatted data, either directly or through an intermediate frequency conversion process which may be implemented as follows. The antenna control module 77 and transmitter/receiver switch module 73 provide the inbound RF signal 88 to the receiver filter module 71, where the receiver filter module 71 bandpass filters the inbound RF signal 88. The receiver filter module 71 provides the filtered RF signal to low noise amplifier 72, which amplifies the inbound RF signal 88 to produce an amplified RF signal. The low noise amplifier 72 provides the amplified inbound RF signal to the down-conversion module 70, which directly converts the amplified inbound RF signal into an inbound low IF signal or baseband signal based on a receiver local oscillation clock 81 provided by local oscillation module 74. The down-conversion module 70 provides the inbound low IF signal or baseband signal to the filtering/gain module 68 via the radio interface 35.

The filtering/gain module 68 filters and/or gains the inbound low IF signal or the inbound baseband signal to produce a filtered inbound signal. The analog-to-digital converter 67 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by the wireless interface device 60. The host interface 62 provides the recaptured inbound data 92 to the host device (e.g., 50) via the peripheral interface (e.g., 55).

As will be appreciated, the wireless communication device described herein may be implemented using one or more integrated circuits. For example, the host device 50 may be implemented on one integrated circuit, the digital receiver processing module 64, the digital transmitter processing module 76 and memory 75 may be implemented on a second integrated circuit, the remaining components of the wireless interface device 60 may be implemented on a third integrated circuit and the second transceiver and antenna section 40 may be implemented on a fourth integrated circuit. Alternatively, the MAC 102, PHY 104 and radio transceiver 61 may be implemented as one integrated circuit, a front end module 109 may be implemented as a second integrated circuit and a second transceiver and antenna section 40 may be implemented as a third integrated circuit.

As another alternate example, the wireless interface device 60 may be implemented on a first integrated circuit and the second transceiver and an antenna section 40 may be implemented in a second integrated circuit. As yet another example, the wireless interface device 60 and a second transceiver and antenna section 40 may be implemented in a single integrated circuit. In addition, the processing module 51 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 51 and the digital receiver and transmitter processing module 64 and 76.

Figure 4:
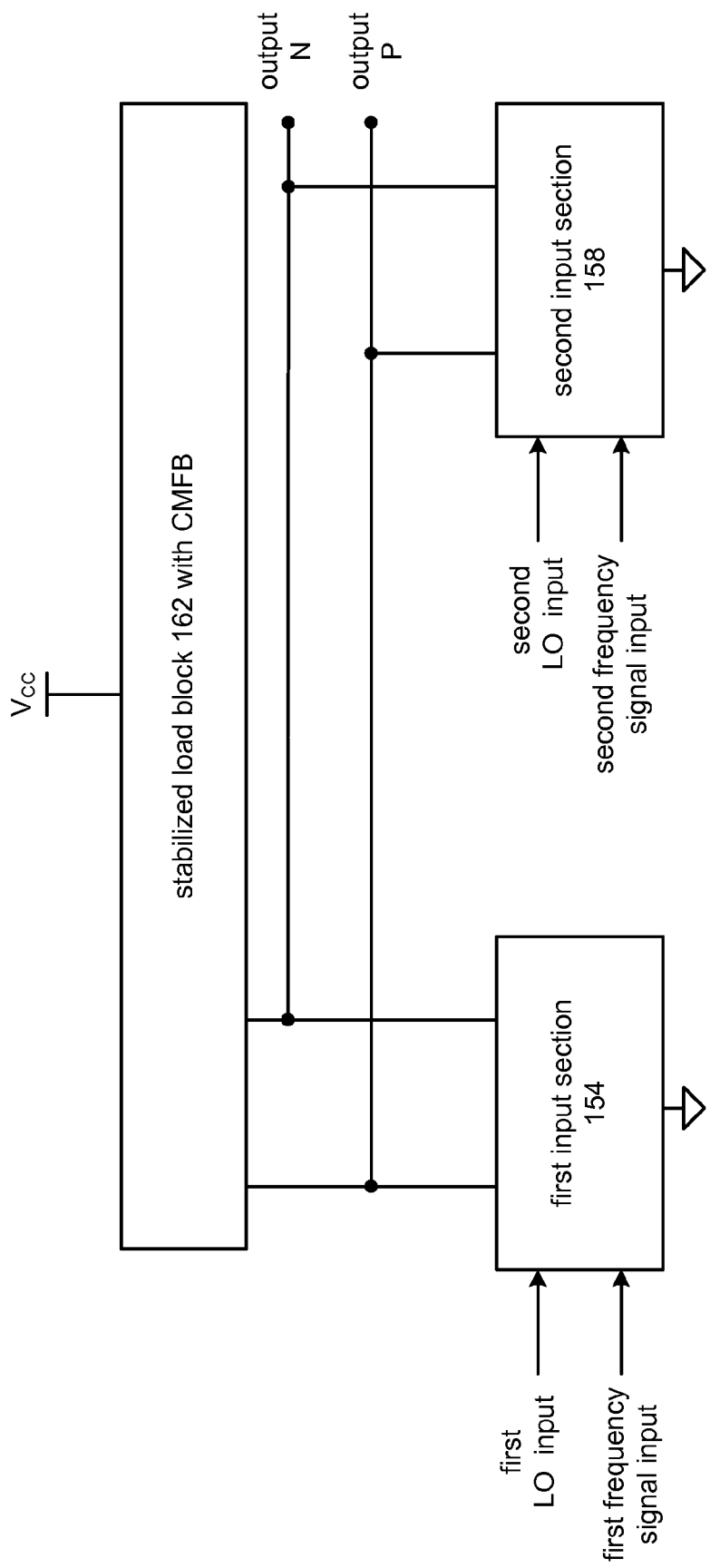
FIG. 4 is a functional block diagram of a dual-band radio input transceiver block formed according to one embodiment of the present invention.

FIG. 4 is a functional block diagram of a dual-band radio input transceiver block formed according to one embodiment of the present invention. As may be seen, a dual-band radio input transceiver block 150 includes a first input section 154, a second input section 158, and a common stabilized load block 162 with common mode feedback to eliminate a common mode signal component. First input section 154 is coupled to receive a first local oscillation input and a first frequency band signal input. Similarly, second input section 158 is coupled to receive a second frequency band signal input and a second local oscillation input. The first input section 154 and the second input section 158 contain schematically similar circuits for receiving a signal input and for mixing that signal input with a local oscillation. Significantly, however, the geometries of the transistor elements within the first and second input sections 154 and 158 are varied to optimize each input section for its corresponding frequency band. Generally, it is desirable to minimize power consumption and noise while improving linearity and gain. As such, a tradeoff exists between some of these competing goals. Thus, linearity and gain may be sacrificed for the sake of reducing power consumption and reducing noise. One type of noise that is specifically reduced or increased according to device geometries is flicker noise, for example.

As may further be seen from FIG. 4, the first and second input sections 154 and 158 include a common stabilized load that produces a stabilized output without a common mode signal component. As such, the output of the stabilized load block 162, here in FIG. 4, may be produced to downstream front end radio transceiver elements, such as variable gain amplifiers, filters, and analog-to-digital converter blocks. As such, the output of the first input section 154 and the second input section 158, which is a down-converted signal, is produced to a front end combined input path. Interestingly, even though first input section 154 and second input section 158 receive first frequency band signal inputs and second frequency band signal inputs, respectively, an output frequency of the first and second input sections is designed to be operably similar. Accordingly, in one embodiment of the invention, first and second input sections both produce a baseband frequency signal. In a second embodiment of the invention, first and second input sections 154 and 158 produce a low intermediate frequency band signal. In either case, stabilized load block 162 with common mode feedback produces a stabilized output signal, 1.2 volts in the described embodiment, without a common mode signal component.

Figure 5:
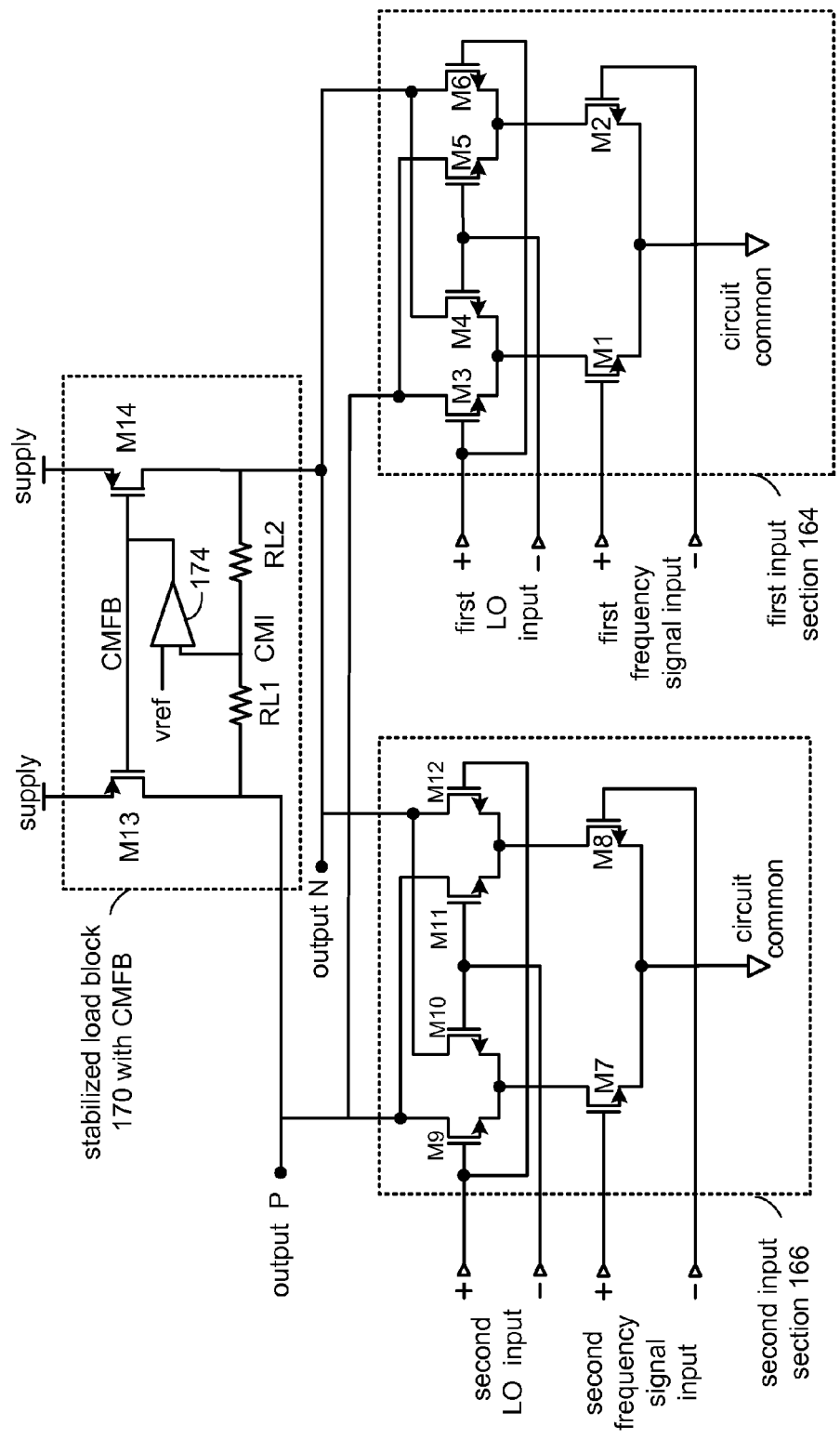
FIG. 5 is a dual-band input transceiver block formed according to one embodiment of the present invention.

FIG. 5 is a dual-band input transceiver block formed according to one embodiment of the present invention. A first transistor input section 164 and a second transistor input section 166 have commonly coupled outputs that are produced to a stabilized load block 170 with common mode feedback. First transistor input section 164 includes a pair of input transistors M1 and M2 that are operatively coupled to receive a first frequency signal input. Two additional transistor pairs formed of transistors M3 and M4, and M5 and M6, respectively, are operatively coupled to receive a first local oscillation input. Generally, the transistors M1-M6 are operatively coupled to form a Gilbert multiplier. The operation of Gilbert multipliers is known by one of average skill in the art. In one embodiment of the invention, though not specifically shown herein, a current source (sink) may be coupled to the sources of transistors M1 and M2 to provide a bias signal therefor. In the embodiments of the present invention, however, a different biasing scheme will be illustrated in greater detail in FIG. 7 below.

Similar to first transistor input section 164, second transistor input section 166 includes a plurality of transistors that are also coupled similarly and that also forms a Gilbert multiplier. Here, second frequency signal inputs are coupled to transistors M7 and M8. The second local oscillation input is coupled to the gates of transistors M3 and M4 and transistors M5 and M6. While the operation of the Gilbert multipliers of the first and second transistor input sections 164 and 166 is known, the inventors generally note that an output of each of the Gilbert multipliers is characterized by a frequency that is equal to one of the sum of the frequencies of the local oscillation and the input signals or a difference of the local oscillation and the input signals. Typically, the Gilbert multiplier produces an output having two frequencies wherein a filter is used to select the desired frequency signal. As such, Gilbert multipliers, as shown herein, may be used to up-convert or down-convert a received radio frequency signal to a lower frequency, such as an intermediate frequency signal or a baseband frequency signal.

As is further shown in FIG. 5, the outputs at the drains of transistors M3-M6 and M9-M12 are connected as shown herein. Generally, in one embodiment of the invention, only one of the first and second transistor input sections is operable at a given instant. By using switch circuitry (not shown herein), one of the two transistor input sections 164 and 166 may be electrically removed from the circuit. As such, the outputs of the transistor input sections 164 and 166 that are electrically coupled are produced to stabilized load block 170 with common mode feedback.

Stabilized load block 170 with common mode feedback includes a differential transistor pair comprised of transistors M13 and M14 whose gates are commonly coupled. In the described embodiment of the invention, transistors M13 and M14 are PMOS transistors, while all other transistors described thus far are NMOS transistors. A drain of transistor M13 is coupled to receive one of two outputs of first and second input transistor sections 164 and 166 and is further coupled to a first differential load resistor RL1. Similarly, a drain of transistor M14 is coupled to a second output of first and second input transistor sections 164 and 166 and is further coupled to a second differential load resistor RL2. Differential load resistors RL1 and RL2 are commonly coupled and are further coupled to an input of a comparator 174. Comparator 174 compares a signal level between differential load resistors RL1 and RL2 to a reference voltage which, in the described embodiment, is equal to 1.2 volts. This reference voltage happens to be equal to ⅔ of a supply voltage level of 1.8 volts. An output of comparator 174 is commonly coupled to the gates of transistors M13 and M14. In operation, the comparator 174, as coupled here in FIG. 5, tends to cause an output signal level at the drains of transistors M13 and M14 to be regulated at the reference voltage level of 1.2 volts. As such, according to which of the first and second input transistor sections 164 and 166 is operable at a given instant, an output signal from the dual-band input transceiver block of FIG. 5 will be stabilized at 1.2 volts and will have removed any common mode signal component appearing between the drains of transistors M13 and M14.

The inventors herein generally observe that a low noise amplifier receiving an input RF signal produces reduced levels of gain for higher frequency levels. Herein, for example, a low noise amplifier cannot produce as much gain for a 5 GHz input signal as it can for a 2.4 GHz signal. Accordingly, it is desirable, especially for the 5 GHz input signal, to increase gain. Generally, an increase in a transistor's length/width ratio increases the gain as well as linearity. A drawback, however, is that current also increases, thereby increasing power consumption. Noise, especially flicker noise, also decreases as yet another advantage to increasing the length/width ratio.

Accordingly, device geometries are optimally changed for the first and second input transistor sections 164 and 166 according to the frequency band in which each will be operating. Accordingly, the transistors of the first input transistor section which operates at 5 GHz, will tend to have greater length/width ratios than the second input transistor section 166 which operates at 2.4 GHz. In one embodiment of the invention, for example, the length-to-width ratios for the input transistors of the first input transistor section 164 are approximately twice that of the second input transistor section 166. In the described embodiments of the invention, the input transistors M1 and M2 for receiving the first frequency signal input are formed with a length/width ratio equal to 26/0.18 microns. The length/width ratios for the second frequency signal input transistor pairs formed by transistors M7 and M8 are equal to 12/0.18 microns. A length-to-width ratio for transistors M3-M6, in the described embodiment of the invention, is equal to 44/0.25 microns. Similarly, the length-to-width ratios for the second switching transistor pairs, comprised of transistors M9-M12, is equal to 32/0.25 microns.

In the described embodiment of the invention, the inventors note that the length-to-width ratios described are minimal ratios and that the specific numbers are based on 0.18 micron technology. If a different micron technology is used to form a circuit that includes teachings of the present invention, then the lengths would proportionately change according to a change in the micron technology. For example, micron technology processes that are presently available are as small as 0.09 microns. As such, the first input transistor section, and more specifically, the first frequency signal input transistors M1 and M2, would have a length of 13 microns to correspond to a width of 0.09 microns to maintain the same ratio. As device sizes will continue to shrink with improvements in technology, the lengths may further be reduced. For example, it is expected that 0.045 micron technology processes will be upon us before too long.

Each of these length-to-width ratios illustrated is a minimum according to the described embodiments of the invention. Generally, those length-to-width ratios may be increased by as much as 50 percent. Accordingly, transistors M1 and M2 may have a length-to-width ratio equal to 39/0.18, while transistors M7 and M8 have a length-to-width ratio of 18/0.18. Similarly, while transistors M3-M6 may be produced with a length-to-width ratio equal to 66/0.25, transistors M9-M12 may be formed with a length-to-width ratio of 48/0.25. Again, if the micron technology is reduced, these ratios may also be proportionately reduced. Generally, the described ratios of the embodiment of the invention are ratios that achieve design requirements for linearity and gain while reducing noise and power consumption.

Figure 6:
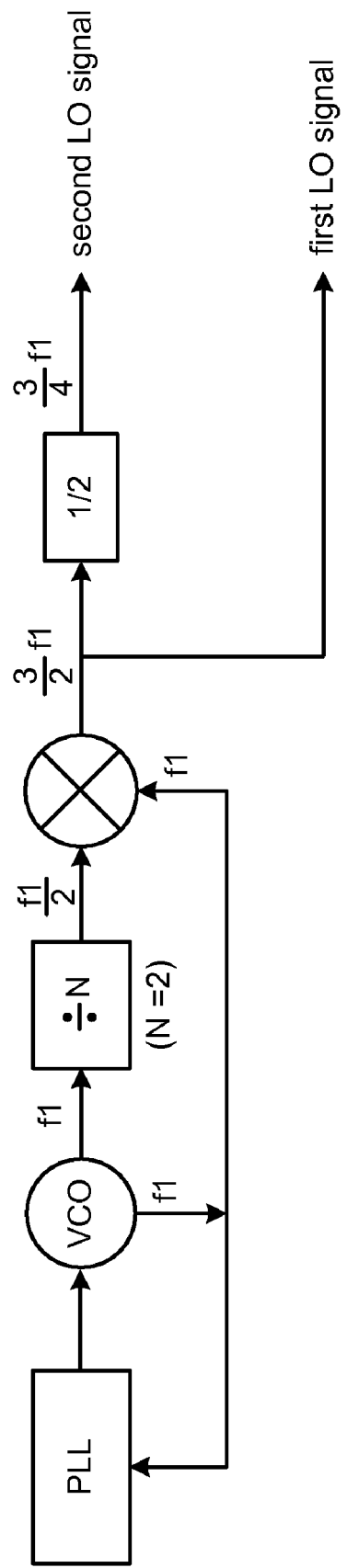
FIG. 6 is a functional schematic block diagram of a dual local oscillator output phase lock loop formed according to one embodiment of the present invention.

FIG. 6 is a functional schematic block diagram of a dual local oscillator (LO) output phase lock loop (PLL) formed according to one embodiment of the present invention. A PLL block produces a voltage to a voltage controlled oscillator that produces a frequency f1 based on an input voltage level. The frequency f1 is produced to a "divide by 2" block which produces a signal f1/2 to a mixer. The output signal f1 of the VCO is also produced as an input to the mixer. As a result, the mixer produces an output signal equal to 3f1/2. This output signal 3f1/2 is the first LO signal. That signal, in the described embodiment, is also produced to a "divide by N" block (2 in the described example) which produces a 3f1/4 frequency signal as the second LO signal. As may be seen, the first LO signal has a frequency that is twice the second LO signal. Advantageously, producing a second LO signal in this manner reduces potential phase and timing problems.

Figure 7:
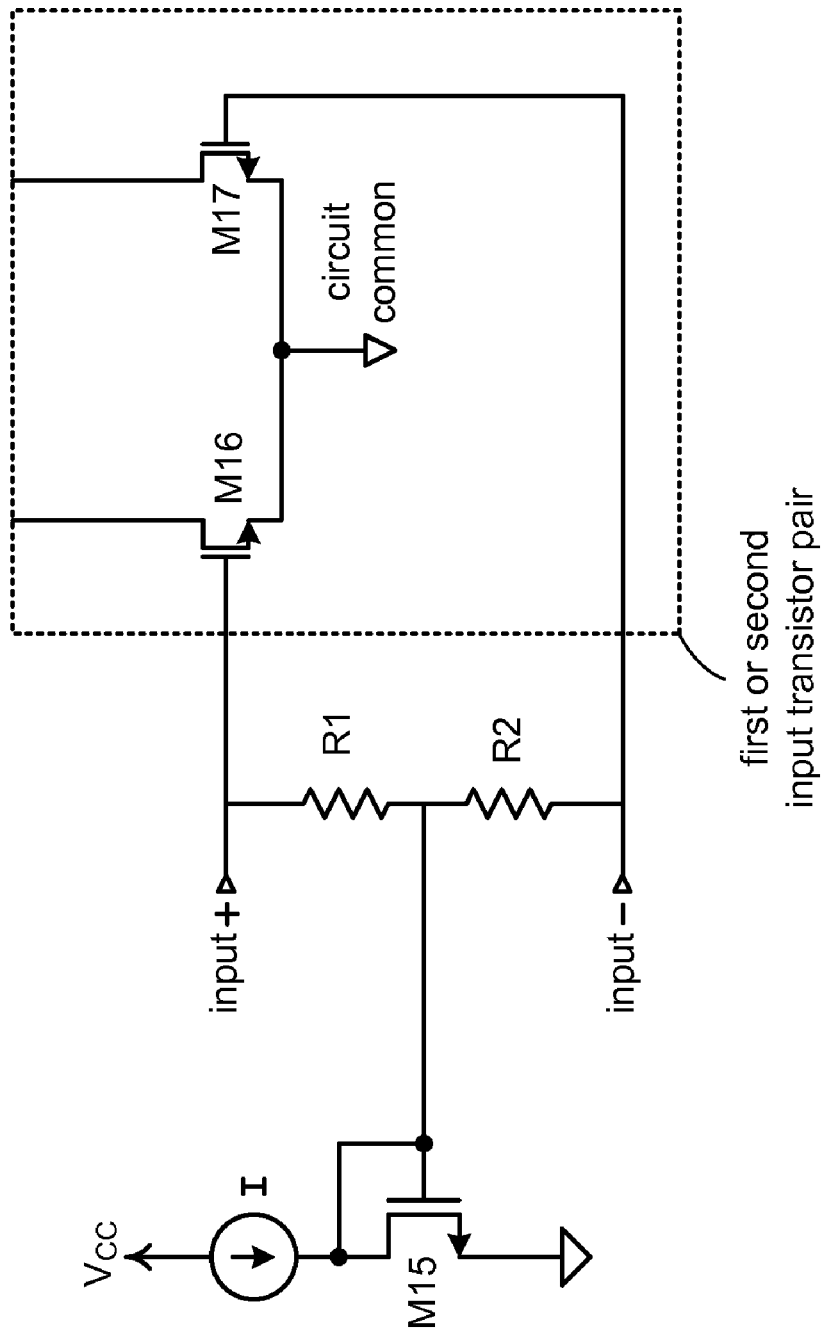
FIG. 7 is a functional schematic diagram that illustrates a biasing technique according to one embodiment of the present invention.

FIG. 7 is a functional schematic diagram that illustrates a biasing technique according to one embodiment of the present invention. A supply voltage is coupled to a current source that produces a current I into a current mirror configuration formed by a transistor M15. A gate of transistor M15 is coupled between two resistors of a voltage divider. One end of each resistor of the voltage divider is coupled to the gates of transistors M16 and M17 which are the transistors of the input transistor pairs of FIG. 5. For example, M16 may be either M1 or M2 of FIG. 5, or transistors M7 and M8, also of FIG. 5. Using a current mirror as described here in FIG. 7 is advantageous in that transistors M16 and M17 may be biased into an operational mode while minimizing a voltage drop for biasing purposes in a signal path.

Figure 8:
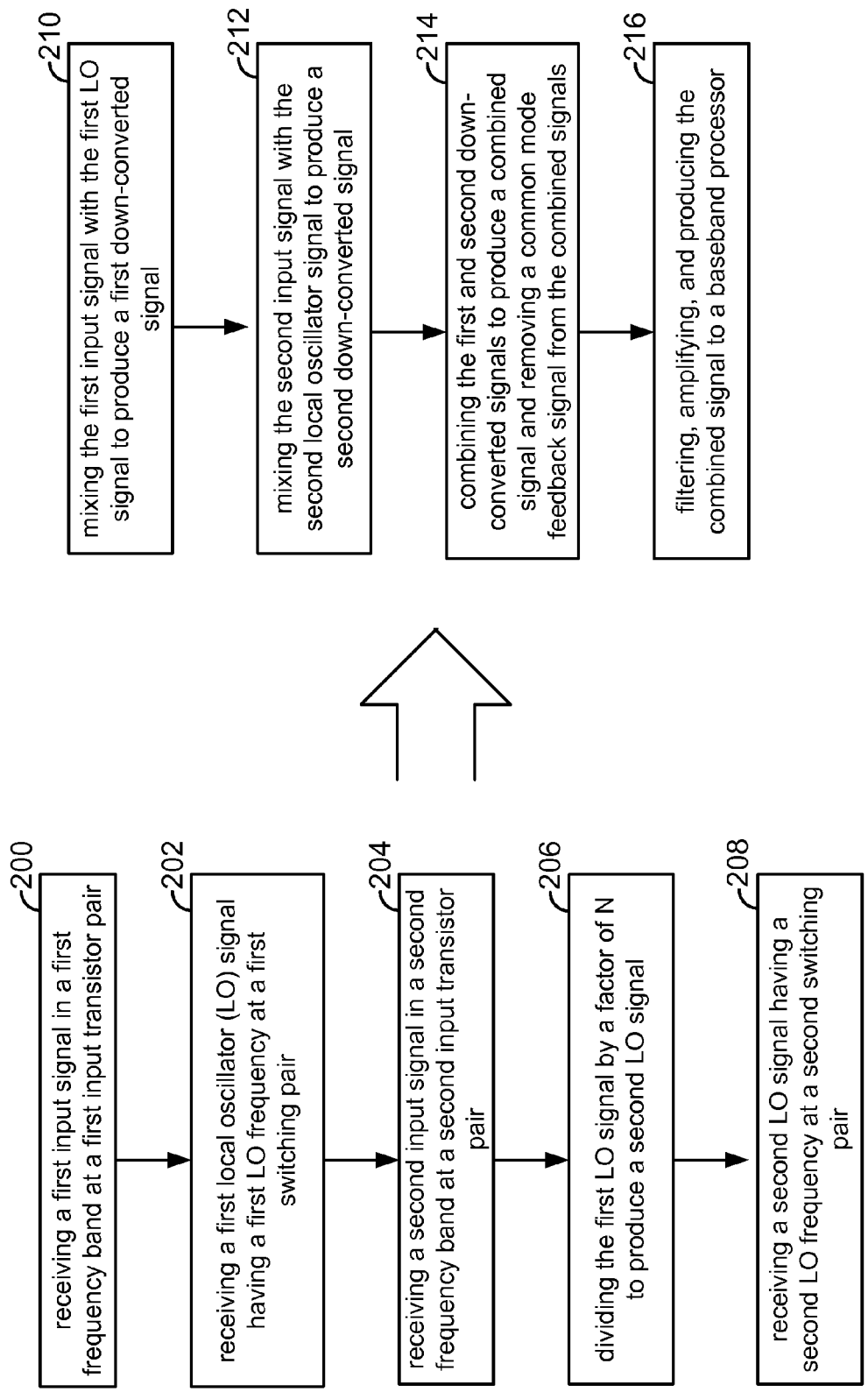
FIG. 8 is a flow chart illustrating a method according to one embodiment of the present invention.

FIG. 8 is a flow chart illustrating a method according to one embodiment of the present invention. The method includes receiving a first input signal in a first frequency band at a first input transistor pair (step 200). A first local oscillation (LO) signal having a first LO frequency is also received at a first switching pair (step 202). A second input signal is received in a second frequency band at a second input transistor pair (step 204). In one embodiment of the invention, the invention includes dividing the first LO signal by a factor of N to produce a second LO signal (step 206). Thereafter, the invention includes receiving the second LO signal having a second LO frequency at a second switching pair (step 208). Thereafter, the invention includes mixing the first input signal with the first LO signal to produce a first down-converted signal (step 210). Additionally, the invention includes mixing the second input signal with the second LO signal to produce a second down-converted signal (step 212). In the described embodiments of the invention, the outputs are produced to a front end combined input path. Effectively, the outputs are combined at a stabilized load block that removes a common mode feedback signal. Accordingly, the invention includes combining the first and second down-converted signals to produce a combined signal and removing a common mode feedback signal from the combined signals (step 214). Finally, in the front end combined input path, the invention includes filtering, amplifying and producing the combined signal to a baseband block (step 216).

As described here in FIG. 8, the circuitry includes first and second input transistor pairs and first and second switching pairs for each of the first and second frequency input signals. The separate signal paths are then combined after the mixing circuitry that down-converts the received RF signal to one of a baseband frequency signal or intermediate frequency signal. In one embodiment of the invention, the input circuits may operate simultaneously while, in another embodiment of the invention, the first and second input transistor pairs are switched to operate in a mutually exclusive manner. For this embodiment, a dual-band transceiver may operate by alternating between frequency bands according to the devices with which it is communicating.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A method in an integrated circuit transceiver for communicating over a plurality of frequency bands, the method comprising:
   receiving a first input signal in a first frequency band at a first input transistor pair;
   receiving a first local oscillation (LO) signal having a first LO frequency at a first switching pair of a first input section;
   producing a first down converted signal at an output node based on the first input signal and the first LO signal;
   receiving a second input signal in a second frequency band at a second input transistor pair of a second input section;
   receiving a second LO signal having a second LO frequency at a second switching pair of the second input section wherein the first LO frequency is a multiple of the second LO frequency and wherein the second LO signal is based upon the first LO signal;
   producing a second down converted signal at the output node based on the second input signal and the second LO signal; and
   conducting at least one of the first and second down converted signals in a radio frequency front-end signal path and filtering, amplifying, and producing an ingoing digital signal to a processing block.

2. The method of claim 1 further including removing a common mode feedback signal from the first and second down converted signals.

3. The method of claim 1 wherein the first and second down converted signals are Intermediate Frequency (IF) signals.

4. The method of claim 1 further including producing, in a phase locked loop circuit, the first LO signal and dividing the first LO signal by a constant value to produce the second LO signal.

5. The method of claim 4 wherein the second LO signal is produced by dividing the first LO signal by three.

6. The method of claim 4 wherein the second LO signal is produced by dividing the first LO signal by two.

7. An integrated circuit transceiver for communicating over a plurality of frequency bands comprising:

a first input transistor pair of a first input section that receives a first input signal in a first frequency band;

a first switching pair of the first input section that receives a first local oscillation (LO) signal having a first LO frequency;

wherein an output node coupled to an output of the first input section produces a first down converted signal based on the first input signal and the first LO signal;

receiving a second input signal in a second frequency band at a second input transistor pair of a second input section;

receiving a second LO signal having a second LO frequency at a second switching pair of the second input section wherein the first LO frequency is a multiple of the second LO frequency and wherein the second LO signal is based upon the first LO signal;

wherein the output node is further coupled to an output of the second input section and produces a second down converted signal based on the second input signal and the second LO signal and wherein the output nodes of the first and second input sections are commonly coupled to the output node; and a radio front-end signal path that filters, amplifies, and produces an ingoing digital signal to a processing block based on at least one of the first or second down converted signals received from the output node.

8. The integrated circuit transceiver of claim 7 further including a stabilized load block that:
receives at least one of the first and second down-converted signals from the first and second switching transistor pair; and
cancels a common mode signal level to produce a stabilized output signal based on a reference voltage.

9. The integrated circuit transceiver of claim 7 wherein the first and second down-converted signals are intermediate frequency band signals having a frequency in excess of 40 MHz.

10. The integrated circuit transceiver of claim 7 wherein the transistor geometry of the first input transistor pair and the first switching transistor pair are optimized for the first frequency band.

11. The integrated circuit transceiver of claim 10 wherein the first frequency band is approximately 5 GHz and wherein the transistor geometry for first input transistor pair is formed to have a corresponding length-to-width ratio.

12. The integrated circuit transceiver of claim 11 wherein the transistor geometry comprises an approximate comprises an approximate specified length in the range of 26 to 39 microns and a width in the range of 0.045 to 0.25 microns.

13. The integrated circuit transceiver of claim 10 wherein the first frequency band is approximately 2.4 GHz and wherein the transistor geometry for first input transistor pair is formed to have a corresponding length-to-width ratio.

14. The integrated circuit transceiver of claim 13 wherein the transistor geometry comprises an approximate comprises an approximate specified length in the range of 26 to 39 microns and a width in the range of 0.045 to 0.25 microns.

15. The integrated circuit transceiver of claim 10 wherein the second frequency band is approximately 2.4 GHz and the second input transistor pair optimized transistor geometry comprises an approximate specified length in the range of 12 to 18 microns and a width in the range of 0.045 to 0.24 microns.

16. The integrated circuit transceiver of claim 10 wherein the second frequency band is approximately 2.4 GHz and the second input transistor pair optimized transistor geometry comprises an approximate specified length in the range of 44 to 66 microns and a width in the range of 0.25 to 0.38 microns.

17. A method in an integrated circuit transceiver for communicating over a plurality of frequency bands, the method comprising:
producing first and second local oscillation (LO) signals having different LO frequencies wherein a frequency of the first LO signal is a multiple of a frequency of the second LO signal;
at least one of down converting a first input signal received at a first input with the first LO signal to produce a first down converted signal at an output node and down converting a second input signal received at a second input with the second LO signal to produce a second down converted signal at the output node;
filtering, amplifying and converting at least one of the first and second down converted signals to an ingoing digital signal and producing the ingoing digital signal to a processor; and
stabilizing a common mode output level m a stabilized load block having common-mode feedback.

18. The method of claim 17 where the first and second down converted signals are both baseband frequency signals.

19. The method of claim 17 where the first and second down converted signals are both intermediate frequency signals.

20. The method of claim 17 further including removing a common mode feedback signal from one of the first and second down converted signals produced to the output node of the input section.

21. An integrated circuit transceiver for communicating over a plurality of frequency bands, comprising:
a local oscillation (LO) module operable to produce first and second LO signals having different LO frequencies wherein a frequency of the first LO signal is a multiple of a frequency of the second LO signal;
transceiver circuitry further comprising first and second inputs;
down conversion circuitry operable to down convert at least one of a first input signal received at the first input based upon the first LO signal to produce a first down converted signal at an output node of the down conversion circuitry and operable to down convert a second input signal received at the second input based upon the second LO signal to produce a second down converted signal at the output node;
a common feedback block operable to stabilize a common mode output level; and
filtering, amplification and conversion circuitry operable to process at least one of the first and second down converted signals produced at the output node to produce an ingoing digital signal to a processor.

22. The integrated circuit transceiver of claim 21 removing a common mode feedback signal from one of the first and second down converted signals produced to the output node of the input section.

* * * * *

UNITED STATES PATENT AND TRADEMARK OFFICE
CERTIFICATE OF CORRECTION

PATENT NO.         : 8,064,867 B2
APPLICATION NO.    : 12/136706
DATED              : November 22, 2011
INVENTOR(S)        : Qiang Li et al.

It is certified that error appears in the above-identified patent and that said Letters Patent is hereby corrected as shown below:

Col. 13, line 53, in claim 14: delete "comprises an approximate"
Col. 14, line 23, in claim 17: replace "m a" with --in a--

Signed and Sealed this
Twenty-ninth Day of January, 2013

David J. Kappos
*Director of the United States Patent and Trademark Office*